May 7, 1935.  S. J. NORDSTROM  2,000,494
VALVE
Filed Nov. 4, 1930    2 Sheets-Sheet 1
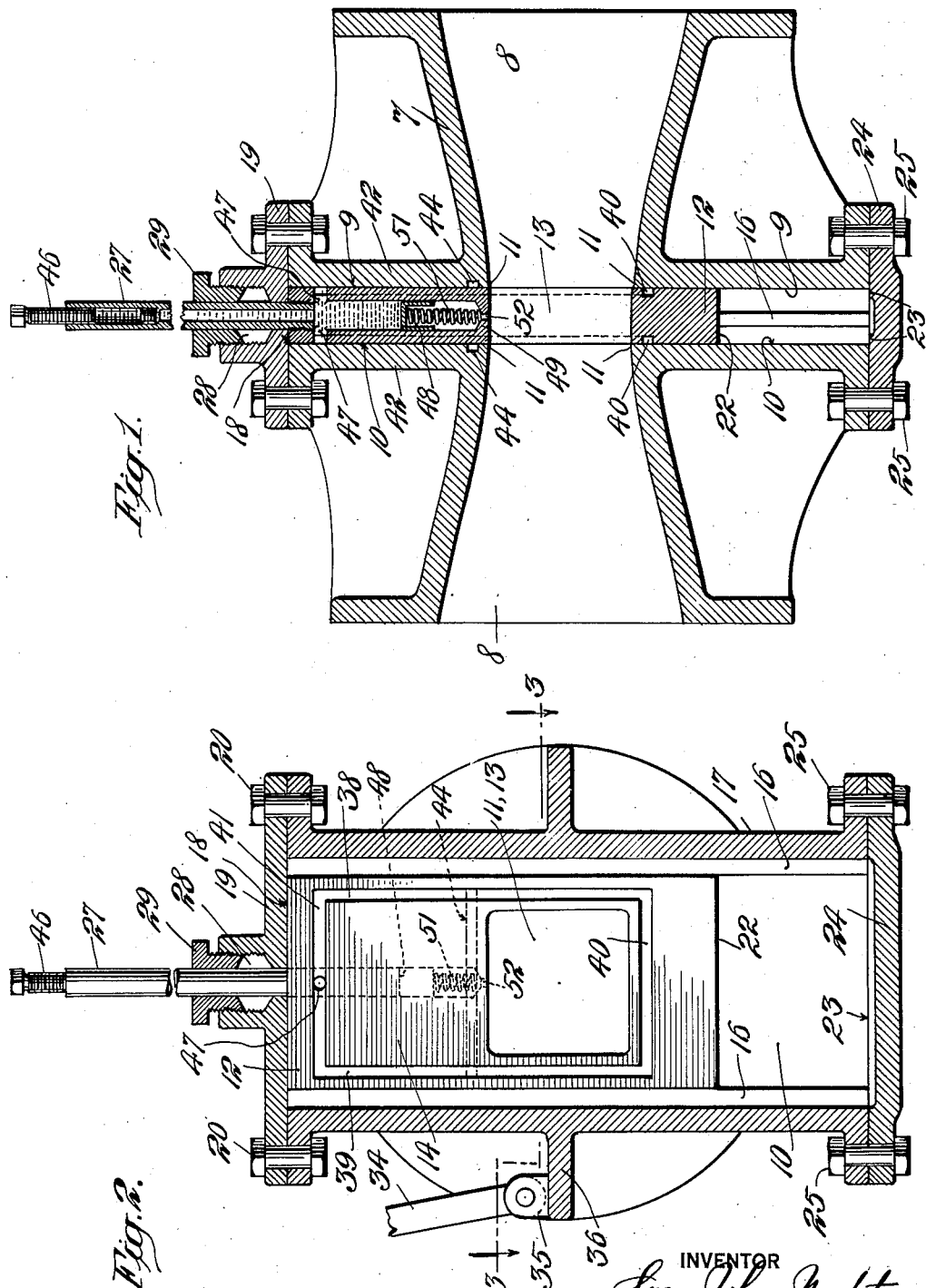
INVENTOR
Sven Johan Nordstrom
BY Archibald Coy
ATTORNEY May 7, 1935.  S. J. NORDSTROM  2,000,494
VALVE
Filed Nov. 4, 1930  2 Sheets-Sheet 2
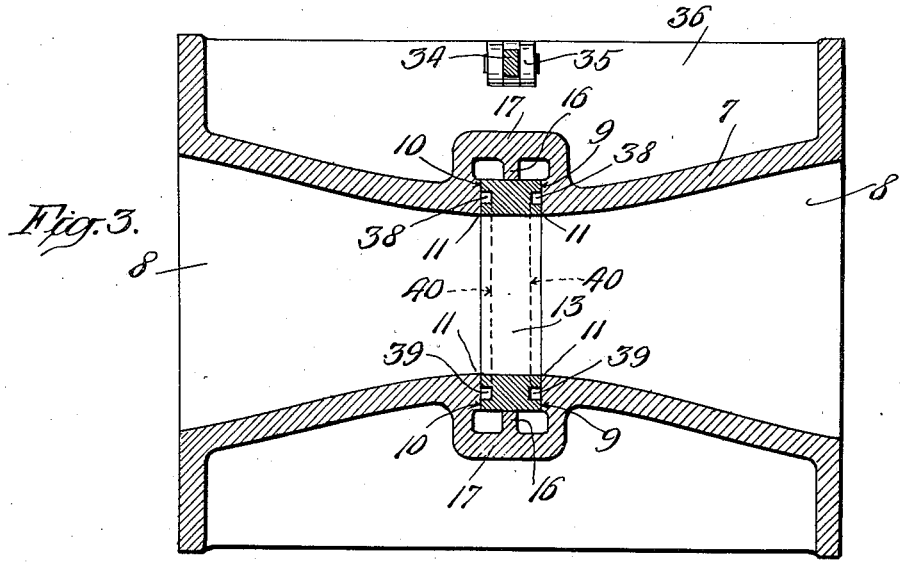
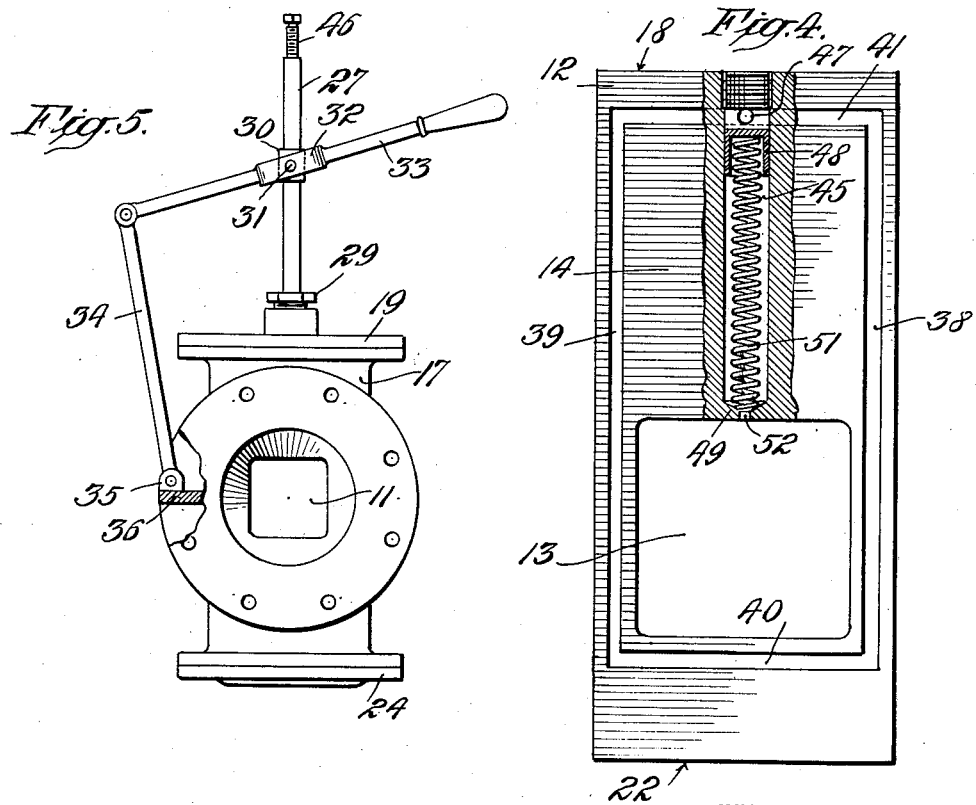
INVENTOR
Sven Johan Nordstrom
BY Archibald Cox
ATTORNEY Patented May 7, 1935

2,000,494

UNITED STATES PATENT OFFICE 2,000,494

VALVE

Sven Johan Nordstrom, Piedmont, Calif., assignor to Merco Nordstrom Valve Company, San Francisco, Calif., a corporation of Delaware Application November 4, 1930, Serial No. 493,252

13 Claims. (Cl. 251—60)

The invention relates to an improvement in valves, and more particularly to an improvement in gate or slide valves of the type in which there is no separation of the co-acting or working valve surfaces. In the more usual type of gate valve the slide or movable member is tapered and the casing or body portion of the valve is provided with tapered walls constituting a valve seat or seats. When this type of gate valve is closed a tight fit is established by wedging the tapered slide into the tapered opening between the walls of the seats in the casing. In the type of gate or slide valve with which the present invention is concerned the slide or movable member has parallel sides and works between parallel walls or seats in the casing. The space between the slide and the valve seat is made as small as is practicable to facilitate filling the space with a plastic sealing substance which is usually a viscous lubricant. Valves of this character are largely employed in mains for gas transmission. When thus used they remain open for long periods of time and are closed only rarely, as in cases of emergency, and then only for relatively short periods. As these valves have been heretofore constructed difficulty has been experienced in closing the valves after long periods of use because the fluid passing through the valve has penetrated to the co-acting or working valve surfaces and caused them to corrode. In this connection it will be understood that when a gate or slide valve is in open condition the co-acting or working valve surfaces which are adjacent each other are relatively large and hence when corrosion takes place between them there is difficulty in disrupting the corrosion and closing the valve.

One object of the present invention is to produce a gate or slide valve in which the fluid passing through the valve is prevented from reaching the co-acting or working valve surfaces when the valve is in open condition. For this purpose a system of grooves is provided surrounding the port at a substantially uniform distance therefrom, this distance being the maximum amount through which the viscous lubricant can be forced under predetermined pressure laterally from the grooves. The space between the grooves and the port is known as the sealing lap, and the width of this space, that is, the distance of the grooves from the port, is determined by three factors, clearance between the co-acting or working valve surfaces, the viscosity of the lubricant or sealing substance, and the predetermined pressure exerted on the lubricant or sealing substance. By thus surrounding the port with grooves forming a continuous or closed circuit groove at a fixed optimum distance from the port and filling the groove with lubricant under constant pressure while the valve is in open condition, the valve can always be readily and quickly closed in cases of emergency. As the slide is moved to close the valve, the lubricant under pressure smears over the entire moving valve surfaces of the slide, and consequently when the valve is to be opened again the recently lubricated slide surfaces permit this to be easily done.

Another object of the invention is to provide a valve of this character with a system of lubricating or sealing grooves so arranged that all the grooves of the entire system will always be in communication with a source of lubricant or sealing substance under constant pressure. A further object of the invention is to provide the valve with improved means for maintaining the lubricant or sealing substance in the groove or grooves under a pressure which exceeds the line pressure by a predetermined amount, so that the lubricant or sealing substance may always be forced from the grooves to smear over the adjacent co-acting valve surfaces. Other objects of the invention and their advantages will be pointed out as the description proceeds.

In the accompanying drawings illustrating the preferred form of the invention, Fig. 1 is a vertical longitudinal section through the improved gate or slide valve, with the slide in open position; Fig. 2 is a transverse section through the middle of the valve shown in Fig. 1; Fig. 3 is a longitudinal section taken on the line 3—3 of Fig. 2; Fig. 4 is a side elevation of the slide, a portion of the slide being indicated in section to show the lubricant chamber; and Fig. 5 is an end elevation of the complete valve.

The improved gate or slide valve as illustrated in the drawings comprises a casing or body portion 7 having a longitudinal opening 8 for the passage of fluid therethrough. At substantially the middle point of passageway 8 the casing 7 is provided with a transversely arranged opening having parallelly arranged walls 9 and 10 which constitute valve seats or surfaces. The points 11 at which the walls 9 and 10 meet the passageway 8 indicate what is known as the port of the valve and in the present instance the port is rectangular with slightly rounded corners. The passage of the fluid through the port 11 is controlled by a slide 12 which is conveniently in the form of an elongated rectangular member having a rectangular hole 13 therethrough which is adapted to register with the port 11 when the valve is in open condition. Slide 12 is also provided with a solid portion 14, of greater area than the port 11, which is adapted to entirely cover and so close the port when the valve is in closed condition. As thus far described the valve parts are of usual construction and arrangement.

The faces or valve surfaces of the slide 12 are parallelly arranged and the thickness of the slide is slightly less than the space separating the oppositely disposed parallel walls or valve seats 9 and 10 in the casing. The clearance between the co-acting valve surfaces of the slide and of the casing is such as to permit the slide to work freely and yet is not greater than can be readily filled with a viscous lubricant to establish a tight joint between them. The slide is guided laterally in its axial movements to open and close the valve by means of the parallelly arranged ribs 16 extending inwardly from the middle, substantially rectangular shaped portion 17 of the casing in which the port 11 and the valve seats 9 and 10 are located. When the valve is in open condition, as shown in Figs. 1 and 2, the top end 18 of the slide 12 abuts against the lower surface of a cover 19 secured to the flanged upper end of the part 17 of the casing by means of the bolts 20. In this position of the slide the hole 13 therethrough registers accurately with the port 11 through the casing. When the slide is in closed position with the space 14 thereof shutting off the port 11 the bottom end 22 of the slide abuts against the inner surface 23 of a cover 24 secured to the flanged lower end of the portion 17 of the casing by means of the bolts 25.

The slide 12 is moved to open and close the valve by means of a stem 27 which is in the form of a tube screwed into the upper end of the slide. The stem 27 passes through an opening in the cover 19 and the joint between them may be sealed by packing 28 held in place by a gland 29. On the stem 27 is mounted a block 30 provided with lateral pins 31 pivotally connected with a yoke 32 formed in a handle 33 by which the slide is manipulated. One end of the handle 33 is pivotally connected with one end of a link 34 connected at its other end with the lugs 35 on one of the strengthening external ribs 36 of the casing 7.

Gate or slide valves, as indicated above, are employed in large numbers in gas main service. In such service the valves usually remain open for long periods of time, and are only infrequently closed and then usually during only the time required to effect some repair. Hence, it is clear that during the long periods the valve is open, the co-acting valve surfaces of the slide and the seats in the casing must be sealed from the fluid passing through the valve if corrosion of these surfaces is to be prevented. In the valve of the present invention the fluid passing through the valve is prevented from reaching the co-acting valve surfaces by means of a novel arrangement of grooves for containing the lubricant or sealing substance. For this purpose the slide 12 is provided on each face or valve surface with two marginal grooves 38 and 39 arranged substantially parallel with the longitudinal axis of the slide, with the transverse grooves 40 connecting at each end the lower ends of the two pairs of longitudinal grooves 38 and 39, and with the grooves 41 connecting at each end with the upper ends of the grooves 38 and 39. It will be noted that the lower ends of the grooves 38 and 39 and the transverse grooves 40 are spaced apart from the adjacent edges of the hole 13 a substantially uniform distance, but that the transverse grooves 41 are spaced apart from the remaining edge of the hole 13 by the port closing spaces 14 of the slide. To prevent the fluid passing through the valve from reaching the port closing spaces 14 of the slide and the adjacent co-acting surfaces of the valve seats in the casing when the slide is in open position, each of the two upper ends 42 of the part 17 of the casing in which the valve seats are formed is provided with a transversely arranged groove 44 formed in the valve seats at substantially the same distance from the adjacent edge of the port 11 that the grooves 40 are spaced from the adjacent edges of the hole 13. The two grooves 44 are long enough to bridge the longitudinal grooves 38 and 39 in the slide, as shown in Fig. 2. Consequently when the slide is in open position with the hole 13 in registry with the port 11 the port and the hole are surrounded with a continuous closed circuit groove located at all points at a substantially uniform distance from the port. This distance is substantially the amount the viscous lubricant or sealing substance is able to traverse when it is forced laterally from the groove under pressure, having regard to the clearance between the slide of the valve seats, the viscosity of the lubricant or sealing substance and the pressure exerted on the lubricant or sealing substance. As a result of thus surrounding the alined hole in the slide and the port in the casing, when the slide is in open position, with a closed circuit groove at the optimum distance from the coinciding edges of the hole in the slide and the port through the casing, the relatively large cooperating valve surfaces of the slide, as represented by the port closing spaces 14, and of the valve seats, are effectually sealed from the fluid passing through the valve and so no corrosion may take place between these surfaces from this cause. When, therefore, it is desired to close the valve this may be done readily and quickly, and as the slide moves into closed position the port closing spaces 14 travel over the lubricant or sealing substance filled grooves 44 and are smeared with lubricant so that the slide may again be readily and quickly moved to open position.

The novel means for putting the lubricant or sealing substance in the grooves under pressure, and which constitutes one feature of the present invention, comprises a chamber or reservoir 45 formed as an axial bore in that part of the slide 12 containing the port closing spaces 14. The chamber or reservoir 45 is supplied with lubricant or sealing substance through the tubular stem 27 which is provided on its outer end with a pressure screw 46. The lubricant or sealing substance under pressure passes into the upper transverse grooves 41 from the chamber 45 through the feed holes 47. In order to exert a constant pressure on the lubricant or sealing substance in the grooves over and above that exerted on it by the pressure of the fluid passing through the valve and so force the lubricant or sealing substance out of the grooves laterally, the chamber or reservoir 45 is provided with a piston 48 in the shape of a cup and between the piston and the part 49 of the slide separating the chamber 45 from the hole 13 is interposed an expansion spring 51. The inner wall 49 of the chamber is provided with an aperture 52 which connects the chamber 45 with the hole 13 so as to admit fluid from the line into the chamber. The hole 52 also permits any lubricant which escapes past the piston 48 to find egress from the chamber into the line. To charge the chamber 45 and the grooves with lubricant or sealing substance, the pressure screw 46 is removed and the requisite quantity of the plastic lubricant or sealing substance is pushed down into the hollow valve stem 27. Under the action of turning the screw 46 inwardly into the valve stem the plastic substance is caused to extrude through the feed holes 47 to fill the grooves 41, 38 and 39, 44 and 40 and to act on the piston 48 until the spring 51 is compressed to its utmost as indicated in Fig. 2. During the time the valve is in operation the spring 51 expands and keeps the lubricant in the system of grooves surrounding the port 11 under constant pressure, thereby causing the lubricant to extrude laterally from the grooves and fill the space at this point between the slide and the adjacent surfaces of the valve-seat walls in the casing, thereby preventing the seepage of the line fluid past the sealing grooves. It will be understood from the above-described arrangement of the chamber 45 and the piston 48, and of the lubricant grooves with relation to the passageway 8, that the only effective pressure forcing the lubricant out of the grooves to fill and seal the clearance space between the slide and the valve-seat walls adjacent the grooves, is the pressure exerted on the lubricant in the grooves by the spring charged piston 48, and that this pressure can be any predetermined amount, depending on the clearance between the slide and the valve-seat walls and the viscosity of the lubricant.

Having thus described the invention what I claim as new is:—

1. A valve comprising a casing provided with a port and having parallel valve-seat walls, a parallel-walled slide arranged to slide between the valve-seat walls, said slide having a hole adapted to register with the port in the open position of the slide, the valve-seat walls and the slide being provided with grooves arranged to form a closed circuit groove surrounding the port at a substantially uniform distance therefrom when the slide is in open position and so disposed whereby in moving to closed or open position said grooves do not communicate with the port area, and pressure means for filling the grooves with lubricant or sealing substance.

2. A valve comprising a casing provided with a port and having parallel valve-seat walls, a parallel-walled slide arranged to slide between the valve-seat walls, said slide having a hole adapted to register with the port in the open position of the slide, the valve-seat walls and the slide being provided with grooves arranged to form a closed circuit groove surrounding the port at a substantially uniform distance therefrom when the slide is in open position and so disposed as not to be exposed to line fluid in opening or closing the valve, and pressure means for filling the grooves with lubricant or sealing substance, said distance of the circuit groove from the port being substantially equal to the amount of lateral travel of the lubricant or sealing substance from the groove.

3. A valve comprising a casing provided with a port and having parallel valve-seat walls, a parallel-walled slide arranged to slide between the valve-seat walls, said slide having a hole adapted to register with the port in the open position of the slide, the valve-seat walls and the slide being provided with a system of lubricant or sealing substance grooves surrounding the port and the hole when the slide is in open position, and means for putting the lubricant or sealing substance in the grooves under pressure, said grooves being so arranged that all the grooves of the system are in constant communication with the pressure means irrespective of the position of the slide and are not exposed to line fluid in opening or closing the valve.

4. A valve comprising a casing provided with a port and having parallel valve-seat walls, a parallel-walled slide arranged to slide between the valve-seat walls, said slide having a hole adapted to register with the port in the open position of the slide, the valve-seat walls and the slide being provided with a system of lubricant or sealing substance grooves surrounding the port and the hole when the slide is in open position, said grooves being so arranged that none of them is put into communication with the port or the hole in the slide when the slide is moved to either open or closed position, and means for forcing lubricant or sealing substance under pressure into the grooves.

5. A valve comprising a casing provided with a port and having parallel valve-seat walls, a parallel-walled slide arranged to slide between the valve-seat walls, said slide being elongated and having at one end a hole adapted to register with the port, the other end of the slide being adapted to close the port, said slide having on a valve face thereof a series of four connecting grooves arranged as a rectangle surrounding the hole and the port closing space, one of the valve-seat walls in the casing having a transversely arranged groove long enough to span the grooves arranged along the lateral sides of the slide, said groove in the valve-seat wall being located on the side of the port so as to be constantly covered by the port-closing space of the slide and out of communication with the line fluid as the slide is moved to open and close the valve, and means for forcing lubricant or sealing substance under pressure into the grooves.

6. A valve comprising a casing provided with a port and having parallel valve-seat walls, a parallel-walled slide arranged to slide between the valve-seat walls, said slide being elongated and having at one end a hole adapted to register with the port, the other end of the slide being adapted to close the port, said slide having on a valve face thereof a series of four connecting grooves arranged as a rectangle surrounding the hole and the port closing space, one of the valve-seat walls in the casing having a transversely arranged groove long enough to span the grooves arranged along the lateral sides of the slide, said groove in the valve-seat wall being located on the side of the port so as to be constantly covered by the port-closing space of the slide and out of communication with the line fluid as the slide is moved to open and close the valve, and means carried by the slide for forcing lubricant or sealing substance under pressure into the grooves.

7. A valve comprising a casing provided with a port and having parallel valve-seat walls, a parallel-walled slide arranged to slide between the valve-seat walls, said slide having a hole adapted to register with the port and a space adapted to close the port, said slide being provided on one of its valve faces with a groove surrounding the hole and the port closing space, one of the valve-seat walls of the casing being provided with a groove, said grooves being arranged to surround the port and the hole in the open position of the slide at a substantially uniform distance therefrom, the groove in the valve-seat wall being arranged so that it is constantly covered by the port closing space of the slide as the slide is moved and out of communication with the line fluid, and means for forcing lubricant or sealing substance under pressure into the grooves.

8. In a valve of the character described having parallel valve-seat walls and a parallel-walled slide coacting therewith, said valve-seat walls and slide having grooves adapted to contain lubricant or sealing substance, and means for forcing lubricant or sealing substance under pressure into the grooves, said means consisting of a cylinder located in the slide and in communication with the grooves, a piston arranged in the cylinder, a spring for acting on one side of the piston, the cylinder having a hole admitting fluid under pressure from the line to act on the piston, and means for filling the cylinder with lubricant or sealing substance under pressure to put the spring under compression.

9. A valve comprising a casing provided with a port and having parallel valve-seat walls and a parallel-walled slide arranged to slide between the valve-seat walls, said slide having a hole adapted to register with the port, said valve-seat walls and said slide being provided with grooves adapted to contain lubricant or sealing substance under pressure, a cylinder formed in the slide adapted to contain lubricant or sealing substance and being in communication with the grooves, a spring acting against one end of the cylinder and a piston to force lubricant into the grooves, the spring end of the cylinder having an aperture communicating with the hole through the slide, and pressure means in the other end of the cylinder for compressing the lubricant or sealing substance in the cylinder and putting the spring under compression.

10. A valve comprising a casing provided with a port and valve seat-walls, a slide arranged to slide vertically between the valve seat-walls, said slide having a hole adapted to register with the port in one position of the slide, the valve seat-walls and the walls of the slide being interrupted by lubricant grooves, said grooves including a pair of upright grooves in the slide adjacent opposite sides of the port and extending substantially twice the length of travel of the slide, lateral grooves in the slide adjacent the lower side of the hole and communicating with said upright grooves, and lateral grooves in said valve seat-walls arranged adjacent the upper side of said port out of communication at all times with the line fluid, said last named grooves communicating with said upright grooves in open position of the slide, and means for putting lubricant in said grooves under pressure.

11. A valve comprising a casing provided with a port and valve-seat walls, a slide arranged to slide vertically between the valve-seat walls, said slide having a hole adapted to register with the port in one position of the slide, the valve-seat walls and the walls of the slide being interrupted by lubricant grooves, said grooves including a pair of upright grooves in the slide adjacent opposite sides of the port and extending substantially twice the length of travel of the slide, lateral grooves in the slide adjacent the lower side of the hole and having continuous communication with both said upright grooves for open, closed and intermediate positions of the slide, and lateral grooves in said valve seat walls arranged adjacent to the upper side of said port out of communication at all times with the line fluid, said last named grooves having continuous communication with said upright grooves in open, intermediate and closed positions of said slide, and means for putting lubricant in said grooves under pressure.

12. In a valve of the character described comprising a casing provided with a port, a valve seat, and a slide arranged for rectilinear movement in the valve seat, said slide having a hole adapted to register with the port in the open position of the slide, a system of lubricant or sealing substance grooves in the valve seat walls and the slide arranged to form a closed circuit groove surrounding the port at a substantially uniform distance therefrom when the slide is in open position and disposed whereby in moving from open to closed position said grooves are not exposed to line fluid.

13. In a valve of the character described comprising a casing provided with a port, a valve seat, and a slide arranged for rectilinear movement in the valve seat, said slide having a hole adapted to register with the port in the open position of the slide, a system of lubricant or sealing substance grooves in the valve seat walls and the slide arranged to form a closed circuit groove surrounding the port when the slide is in open position and disposed whereby in moving from open to closed position said grooves are not exposed to line fluid, and a channel continually in communication with the closed circuit groove during operation of the valve for introducing lubricant or sealing substance therein.

SVEN JOHAN NORDSTROM.